(12) United States Patent
Wrubel et al.

(10) Patent No.: US 6,502,005 B1
(45) Date of Patent: Dec. 31, 2002

(54) ELAPSED TIME CLOCK FOR PART CALL TAG-BASED REPLENISHMENT SYSTEM

(75) Inventors: Mark A. Wrubel, Detroit, MI (US); Thomas M. Bacon, St. Clair, MI (US); Huong M. Hang, San Jose, CA (US); Walter S. Johnson, San Jose, CA (US)

(73) Assignee: Wherenet Corp, Santa Clara, CA (US)

( * ) Notice: Subject to any disclaimer, the term of this patent is extended or adjusted under 35 U.S.C. 154(b) by 0 days.

(21) Appl. No.: 09/503,167

(22) Filed: Feb. 14, 2000

Related U.S. Application Data
(60) Provisional application No. 60/120,122, filed on Feb. 16, 1999.

(51) Int. Cl.[7] .............................................. G06F 19/00
(52) U.S. Cl. ...................... 700/116; 700/215; 700/96; 705/28; 342/463
(58) Field of Search ............................ 700/96, 99, 106, 700/115, 116, 214, 215, 216, 225, 231, 241, 242; 705/28; 342/450, 463, 465

(56) References Cited

U.S. PATENT DOCUMENTS

| | | | | |
|---|---|---|---|---|
| 4,737,910 A | * | 4/1988 | Kibbrow .......................... | 705/28 |
| 5,119,104 A | | 6/1992 | Heller ........................... | 342/450 |
| 5,541,398 A | * | 7/1996 | Hanson .................. | 235/462.46 |
| 5,699,259 A | * | 12/1997 | Colman et al. ................ | 700/99 |
| 5,745,049 A | | 4/1998 | Akiyama et al. ....... | 340/870.17 |
| 5,920,287 A | * | 7/1999 | Becher et al. ............... | 342/450 |
| 6,005,883 A | * | 12/1999 | Trompower ................. | 375/141 |
| 6,317,082 B1 | * | 11/2001 | Bacon et al. ................ | 345/462 |

OTHER PUBLICATIONS

Peter Hewkin "Smart Tags the Distrubuted Memory Revolution", Jun. 1989, pp. 203–206, especially p. 206, col. 1, par. 1.

John R. Tuttle "Traditional and Emerging Technologies and Applications in the Radio Frequency Identification (RFID) Industry", 1997 IEEE Radio Frequency Integrated Circuits Symposium, pp. 5–8.

\* cited by examiner

*Primary Examiner*—Leo Picard
*Assistant Examiner*—Paul Rodriguez
(74) *Attorney, Agent, or Firm*—Allen, Dyer, Doppelt, Milbrath & Gilchrist, P.A.

(57) ABSTRACT

An elapsed time clock is incorporated into a part call tag for requesting replenishment of components used by workstations of a manufacturing facility. One or more transmission readers spatially distributed around the manufacturing facility detect a part call signal transmitted from the part call tag. A reader output processing subsystem processes part call signals detected by at least one of the tag transmission readers to recover information contained in the part call signal. A management processor associates the recovered information with a respective workstation, and what component is to be replenished. The elapsed time clock is reset when the part call tag is operated to transmit a part call signal, and thereby serves as a call tag 'stop watch'— informing workstation personnel of the length of time that has elapsed since the last part call transmission from that tag.

6 Claims, 3 Drawing Sheets

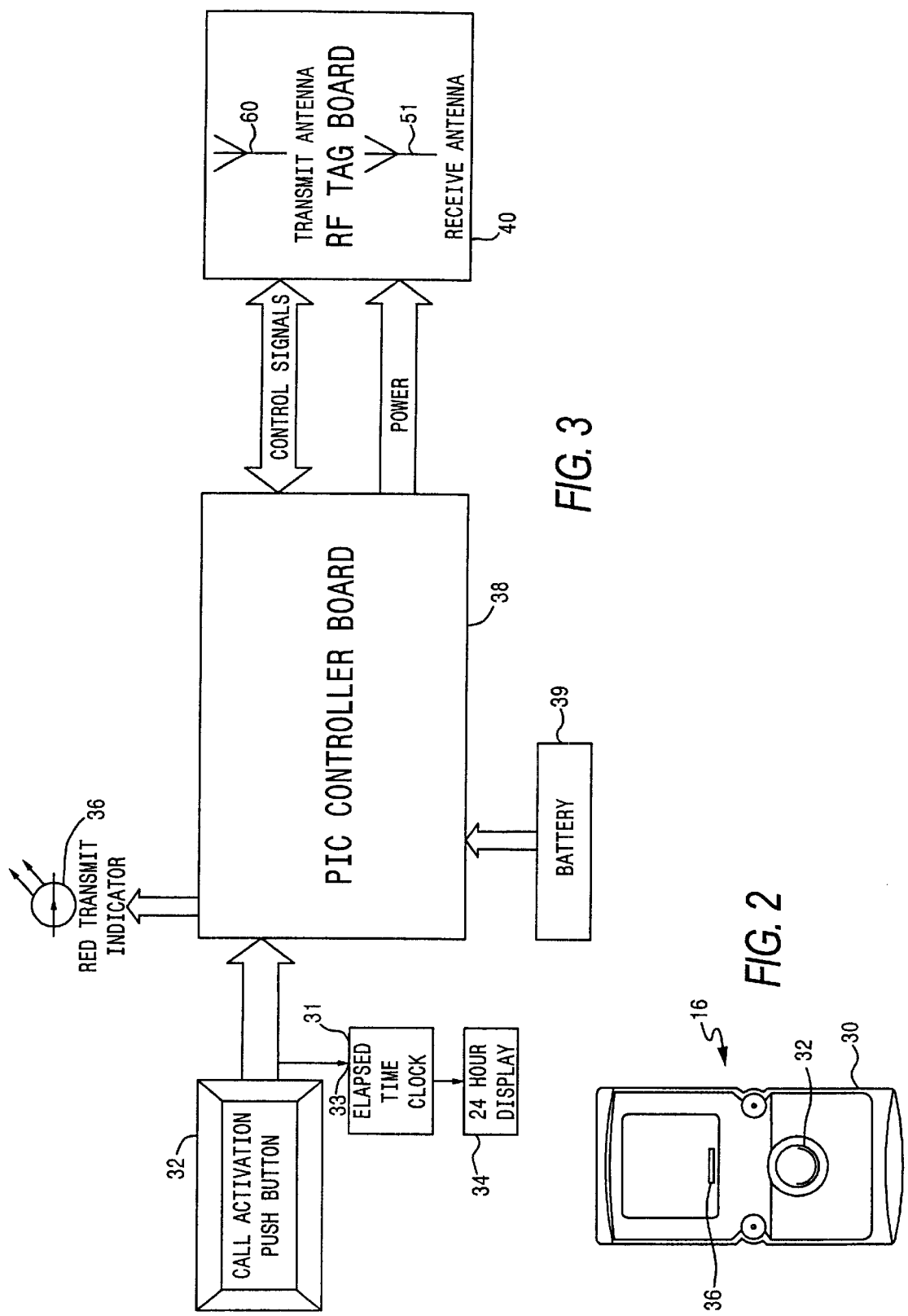

ELAPSED TIME CLOCK FOR PART CALL TAG-BASED REPLENISHMENT SYSTEM

CROSS-REFERENCE TO RELATED APPLICATION

The present application incorporates by reference, in its entirety, U.S. patent application Ser. No. 09/503,675, now U.S. Pat. No. 6,317,082, concurrently filed herewith and assigned to the same assignee as the present application. The present application claims the benefit of U.S. Provisional Patent Application Ser. No. 60/120,122, filed Feb. 16, 1999.

FIELD OF THE INVENTION

The present invention relates in general to part/material replenishment for product manufacture and/or assembly systems and the like, and is particularly directed the use of an elapsed time clock in conjunction with the call tag employed in the wireless call tag-based material replenishment system described in the above-referenced co-pending Bacon et al application. The elapsed time clock serves essentially as a call tag 'stop watch', that is reset whenever a part replenishment call is made, and thereby functions to inform workstation personnel of the length of time that has elapsed since the last part call from that tag.

BACKGROUND OF THE INVENTION

As described in the above-referenced co-pending application, product manufacturers widely employ a technique, referred to as 'pull manufacturing', to replenish components or material required by an assembly line-side workstation in the course of its participation in the production of an item. In accordance with this resupply scheme, parts or material required by a line-side workstation are resupplied in response to a request or 'call' from the workstation to a remote storage management and distribution subsystem, which then retrieves some number of the requested part from a storage facility and delivers them to the requesting site.

Unfortunately, within most manufacturing environments, options for communicating material replenishment requests to those responsible for delivering the parts are considerably limited. A significant number of production facilities continue to employ traditional manual, labor-intensive routines, such as card-based methods. Others, which have attempted to incorporate upgraded communication methods, use hardwired subsystems, that are not only costly to install but, due to their inherent inflexibility, are expensive, time consuming, and labor intensive to retrofit or modify, as the needs and/or retooling of the plant are continually being updated and reconfigured. Although some wireless forms of call systems have been proposed, they are complex—requiring two-way communications with a line-side location—and are therefore very expensive to install and operate.

Pursuant to the invention described in the above-referenced co-pending application, shortcomings of conventional pull manufacturing replenishment systems are obviated by a wireless 'call tag' based system. In accordance with this call tag based scheme, diagrammatically shown in FIG. 1, advantage of the detection and signal processing infrastructure of the tagged object radio location system described in the U.S. Pat. No. 5,920,287, to D. Belcher et al (hereinafter referred to as the '287 patent), by installing one or more 'call tags' 16 at or in proximity of each plant workstation 13 of one or more assembly lines 15 within a manufacturing plant 12. If a workstation employs different components, it is equipped with multiple call tags—one for each different part.

A respective call tag 16 may have a physical configuration, shown in FIG. 2 as including a housing 30, that contains various input/output (I/O) units associated with the use of the call tag, such as a 'part call' push-button 32, and an optical indicator 36. The push-button 32 is employed by a (line-side) operator to trigger the operation (part call transmission) of the call tag. The optical indicator 36 may comprise a light emitting diode (LED), or the like, that is illuminated or flashed when a part replenishment call signal is transmitted by the call tag.

To initiate part replenishment, a line-side workstation operator simply pushes the tag's 'call' button 32. This causes the call tag's internal RF transmitter to transmit a spread spectrum RF transmitter to transmit a spread spectrum RF signal burst that is encoded with the identification (e.g., serial number) of the call tag. At the same time, the call tag's optical indicator 36 (e.g., LED) is flashed to provide a visual indication that the 'part call' was transmitted. The transmitted RF burst is detected by one or more transmission readers 10 of a spatially distributed transmission burst detection and processing subsystem 24. In addition to having the ability to perform tag geolocation processing of the type described in the '287 patent, the signal processing subsystem 24 reads identification and other data conveyed in each call tag transmission. The call tag identification data is used by a resource management operator to access an asset management database 20, which associates each call tag's identity with a part employed by the site where the call tag is located. This enables the resource management operator to specify what component is to be accessed from storage, so that the part may be delivered to the identified call tag's workstation.

Because of the effectively continuously dynamic character of assembly line production, including differences among production shifts and operator assignments, coupled with the ease with which the call tag system described above enables workstation personnel to request material replenishment (simply by pushing a button), system operators may not be particularly diligent in keeping track of replenishment orders. This can lead to duplicate and triplicate orders, as well as out of stock conditions. Moreover, a subsystem failure or an anomaly in the replenishment path, which could lead to assembly line slow down or interruption, may not be immediately noticed. It would be desirable, therefore, to know how recently a parts call has been made. Not only would this advise lineside personnel of the time of the call, but it would aid in determining maximum and minimum inventory levels to be stored lineside.

SUMMARY OF THE INVENTION

In accordance with the invention this objective is fulfilled by an enhancement to the call tag-based replenishment system described in the above-referenced copending application, which is effective to continuously inform workstation personnel of the length of time that has elapsed since the last part call was made from a respective call tag. In particular, the present invention includes the incorporation into the call tag of an elapsed time clock, that is automatically reset in response to the call button being pushed, and thereby essentially operates as a part replenishment 'stop watch'.

Even though experience of normal assembly line operation will customarily enable a workstation operator to anticipate when to expect parts delivery once a parts call has been made, the incorporation of a part call 'stopwatch' or elapsed time device into the call tag not only allows the lineside operator to determine if an expected delivery is late, but to confirm whether a call was actually made within a given time reference (e.g., an assembly line shift). While the elapsed time clock may be installed and operate as a stand-alone item, it is preferred that it be integrated with other components of the call tag, to facilitate ease of use. In accordance with a non-limiting embodiment of the invention, the call tag timer is arranged to be reset by the operation of the call tag's pushbutton. As a non-limiting example, the elapsed time may be displayed by way of a dedicated clock display on the call tag housing.

BRIEF DESCRIPTION OF THE DRAWINGS

FIG. 2 illustrates the general physical configuration of a part replenishment call tag employed in the system of FIG. 1; and FIG. 3 is a block diagram of the circuitry contained in the call tag of FIG. 2, modified to incorporate an elapsed time call tag clock in accordance with the present invention and;

DETAILED DESCRIPTION

Figure 1:
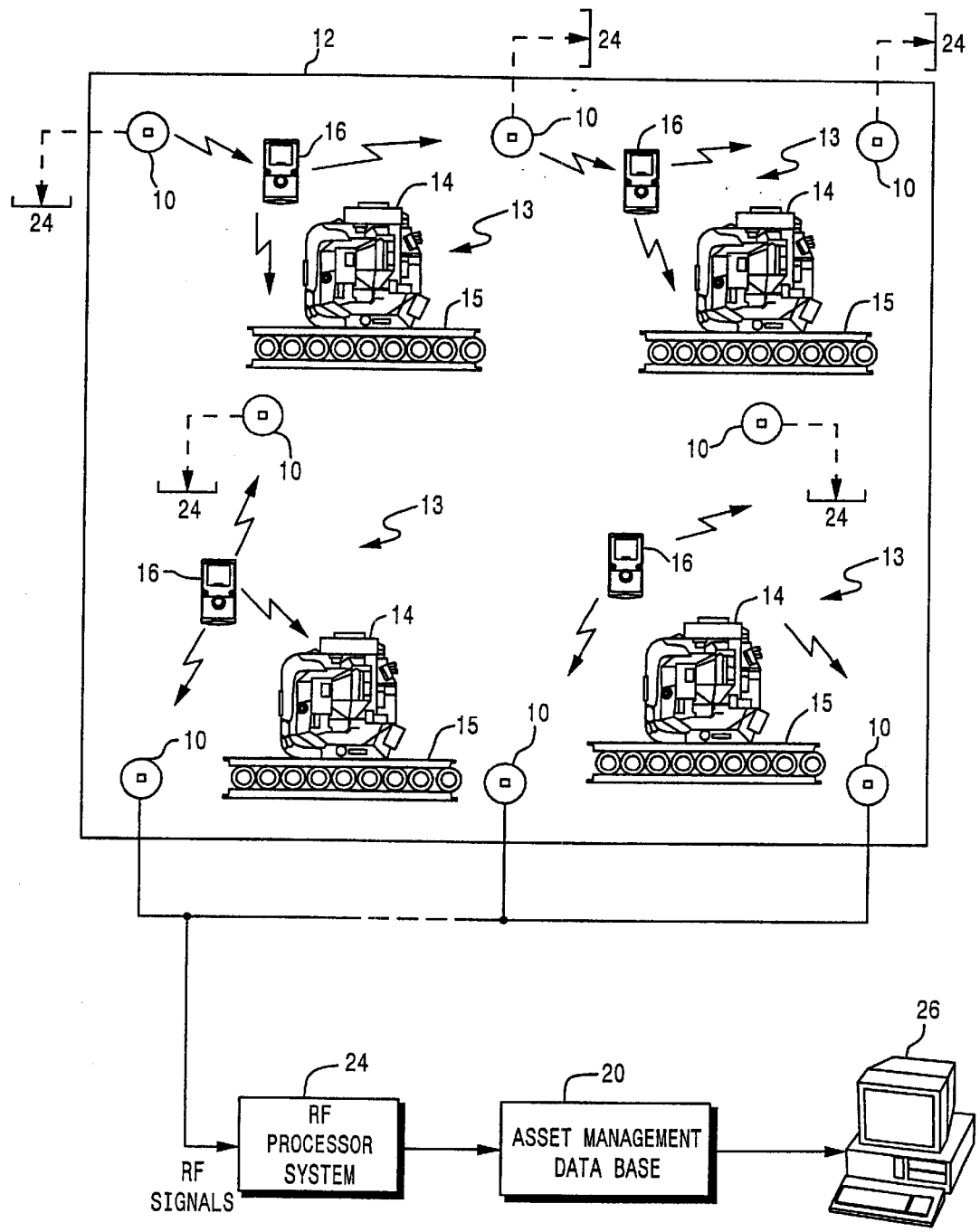
FIG. 1 diagrammatically illustrates the general architecture of the radio location call tag-based part/material replenishment system described in the above-referenced co-pending patent application.

Before describing in detail the elapsed time clock is enhancement to the wireless call tag-based material replenishment system of the above-referenced co-pending application, it should be observed that the invention resides primarily in what is effectively a prescribed arrangement of conventional communication circuits and associated digital signal processing components and attendant supervisory control circuitry therefor, that controls the operations of such circuits and components. Consequently, the configuration of such circuits components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

As pointed out above, although an elapsed time clock enhancement to the call tag of FIG. 2 may be implemented as a stand-alone item, it is preferred that it be integrated with other components of the call tag, to facilitate ease of use and implementation. For this purpose, as shown in FIG. 3, which illustrates the functional architecture of the internal circuitry of the call tag described and shown in detail in the above identified copending application, an elapsed time clock 31, such as one having a standard (six digit) twenty-four hour display 34, may be installed in the call tag housing 30 as a discrete component, with a reset input 33 thereof coupled to the call tag's call pushbutton 32. When employed in the physical configuration of the call tag shown FIG. 2, the elapsed time clock's display 34 may be mounted with a suitable window provided in the call tag housing 30, so that the clock's elapsed time may be continuously viewable by line-side operator personnel.

The internal circuitry of the call tag includes a supervisory control processor 38 (e.g., controller board), with which I/O units such as pushbutton 32 and optical indicator 36 are coupled. Power for the call tag is supplied by a battery 39. Coupled to the control processor 38 is an RF transceiver board 40, having a transmit antenna 60 and a receive antenna 51. The RF transceiver board 40 (shown schematically in FIG. 4 to be described) includes memory, which stores a multibit code identifying the (serial number of the) call tag, and auxiliary data. The call tag's transceiver circuitry is coupled to receive a transmit command from the call tag's control processor 38, so that the call tag's transmitter may generate a 'part call' RF burst transmission containing its identification code and any optional data stored in memory, when triggered by the actuation of the call push button 32.

In response to operation of the part call button 32, the control processor 38 (e.g., micro-controller board) couples a part call command signal to the call tag's transmitter circuitry, which causes the tag's transceiver board 40 to transmit a prescribed number of sequential spread spectrum RF signal bursts encoded with the serial number of the call tag and part call status data downloaded by the call tag's microcontroller to memory. At the same time, the control processor 38 supplies a drive signal to the optical indicator 36 (e.g., LED), which is then illuminated or 'flashed' for a prescribed period of time (e.g., one second) to confirm to the operator that a 'part call' burst has been transmitted. A 'part call' RF burst is received by one or more of a plurality of transmission readers 10 that are distributed within and/or around the workstation production environment of the manufacturing plant and processed for replenishment of the part associated with the call tag, as described briefly above, and detailed in the above-referenced copending application.

Figure 4:
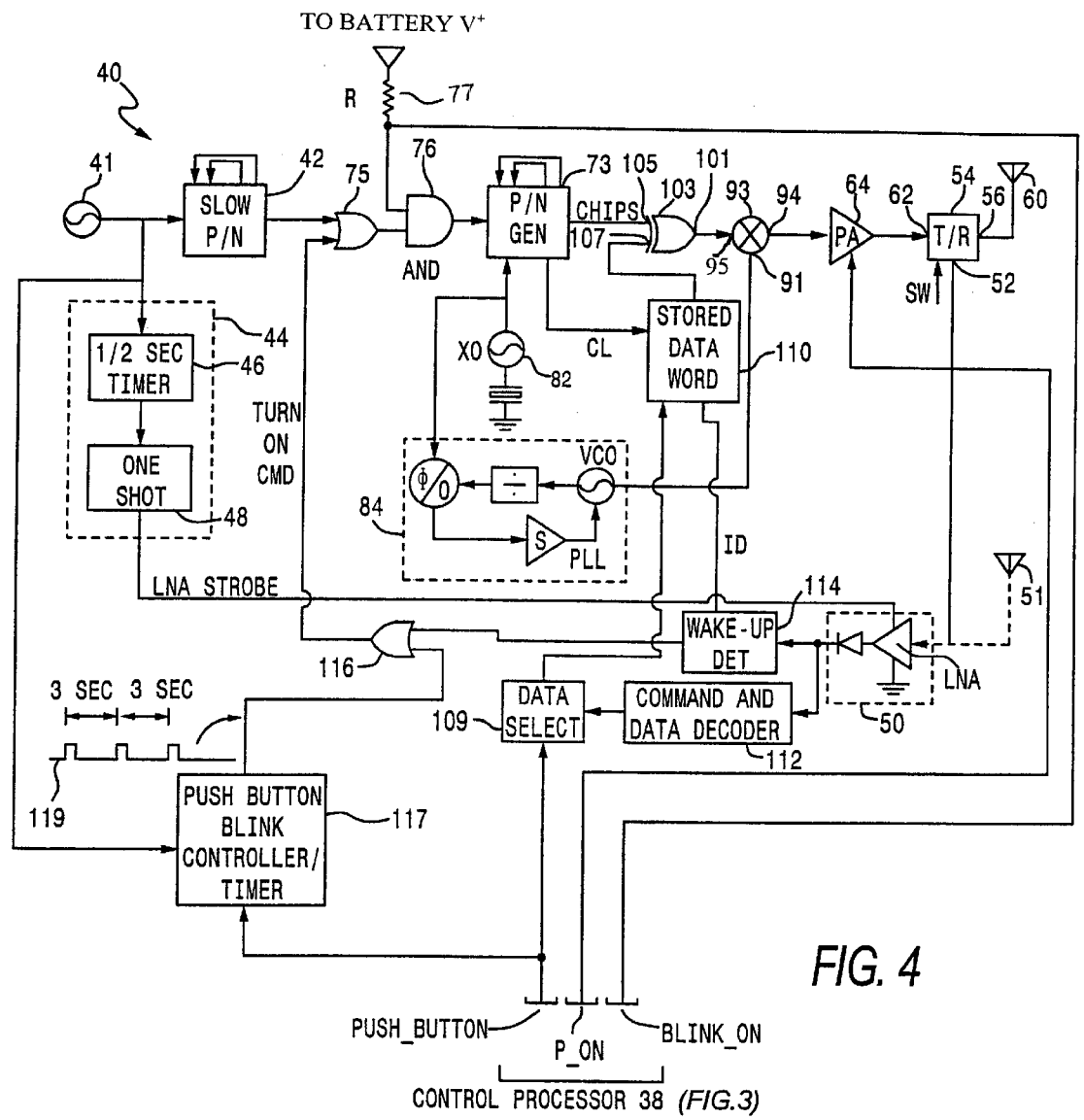
FIG. 4 shows the circuit architecture of the RF transceiver board of the call-tag diagram of FIG. 3.

The circuit architecture of the call tag's RF transceiver unit 40 is schematically illustrated in FIG. 4 as comprising a relatively coarse (RC) oscillator 41, whose output is fed to a 'slow' pseudo random pulse generator 42, a strobe pulse generator 44, and a push button blink timer circuit 117. The strobe generator 44 contains a timer 46 having a prescribed time-out duration (e.g., one-half second) and a (one-shot) delay circuit 48, the output of which is a low energy (e.g., several microamps) receiver enable pulse having a prescribed duration (e.g., one-second wide).

The receiver enable pulse enables or strobes a relatively short range receiver 50, such as a crystal video detector, which requires a very low amount of power compared to other components of the tag. Because the receiver enable pulse is very low power, it does not effectively affect the call tag's battery life. The duration of the receiver enable pulse produced by the strobe pulse generator 44 may be defined such that any low power signal transmitted by another device will be detected by the short range receiver 50.

Where the call tag employs a common antenna that both transmits and receives (or, alternately, a transmitting antenna 60 along with a receiving antenna 15), the short range receiver 50 may have its input coupled to a receive port 52 of a transmit/receive switch 54, a bidirectional RF port 56 of which is coupled to an antenna. The transmit/receive switch 54 has a transmit port 62 coupled to the output of an RF power amplifier 64, which is powered up only during the relatively infrequent transmit mode of operation of the call tag. Alternatively, where the call tag employs separate transmit and receive antennas (as shown at 60 and 51 in the block diagram of FIG. 3), the crystal video receiver 50 may have its input coupled to a receive antenna 51, as shown by broken lines.

The output of the 'slow' pseudo random pulse generator 42 is a series of relatively low repetition rate (for example, from tens of seconds to several hours), randomly occurring 'blink' pulses. These pulses are coupled to a high speed PN spreading sequence generator 73 via an OR gate 75 and an AND gate 76, and serve to define when the call tag is to randomly transmit bursts of wideband (spread spectrum) RF energy (to be detected by the system readers) during its quiescent mode. In response to an enabling pulse, the high speed PN spreading sequence generator 73 generates a prescribed spreading sequence of PN chips. AND gate 76 has a second input hardwired via a pull-up resistor 77 to a battery supply voltage +V, and to a 'BLINK_ON' output from the microcontroller 38. When the 'BLINK_ON' signal is at a logical '0', AND gate 76 is disabled, placing the call tag in the 'OFF' mode, so that no spread signal will be transmitted.

The PN spreading sequence generator 73 is driven at the RF frequency output of a crystal oscillator 82, which provides a reference frequency for a phase locked loop 84, that is used to establish a prescribed output frequency (for example a frequency of 2.4 GHz, to comply with FCC licensing rules). The RF output of loop 84 is coupled to a first input 91 of a mixer 93, the output 94 of which is coupled to RF power amplifier 64. The power amplifier 64 is coupled to supply a transmitter operational state signal PA_ON to the control processor 38 (e.g., micro-controller) to indicate that the RF transceiver unit 40 has been 'awakened' and has 'blinked' an RF burst. The mixer 93 has a second input 95 coupled to output 101 of a spreading sequence modulation exclusive-OR gate 103. A first input 105 of exclusive-OR gate 103 is coupled to receive the PN spreading chip sequence generated by PN generator 73. A second input 107 of exclusive-OR gate 103 is coupled to receive respective bits of data stored in a memory 110, which are clocked out by the PN spreading sequence generator 73.

As a non-limiting example, the tag memory 110 may comprise a relatively low power, electrically alterable CMOS memory circuit, which stores a multibit word or code identifying the call tag. The memory circuit 110 may also store auxiliary data, that may be coupled thereto by an associated data logic circuit 109. The data select logic circuit 109 is coupled to receive information supplied by the microcontroller 38, such as a PUSH_BUTTON signal associated with the operation of the push button 32, as well as data contained in a message that has been transmitted to the call tag from another wireless device, and has been decoded by a command and data decoder 112, coupled in circuit with the output of the short range receiver 50 (e.g., crystal video receiver).

The data select logic circuit 109 is preferably implemented in gate array logic and is operative to append any data received from an external radio source to that stored in memory 110. It may also selectively filter or modify data output by the command and data decoder 112, as downloaded from an external radio source. When a wireless (RF) transmission from an external radio source is received, the call tag's identification code stored in memory 110 is coupled to a 'wake-up' comparator 114, which compares the bit contents of the received message with the stored call tag identification code.

If the two codes match, the comparator 114 generates an output signal, which is used to cause any data contained in the incoming message to be decoded by the command and data decoder 112, and written into tag memory 110 via the data select logic circuit 109. The output of comparator 114 is coupled through an OR gate 116, OR gate 75 and an AND gate 76 to the enable input of PN generator 73. In response, the call tag's transmitter generates a response RF burst, in the same manner as it 'blinks' a PN spreading sequence transmission containing its identification code and any data stored in memory 110, as described above.

The OR gate 116 is also coupled to a push button blink timer circuit 117, which is operative to generate a prescribed (repetitive) timing signal in response to the control processor 38 (e.g., microcontroller or controller board) detecting the operation of the push button 32 and supplying a transmit command signal PUSH_BUTTON. As a non-limiting example, the transmit command timing signal may comprise a series of enabling pulses 119 (e.g., three in the example shown), which cause the transmitter unit to emit a sequence of 'part call' RF bursts (e.g., at a rate of one enabling pulse every three seconds), each of which contains a call tag identification code and any optional data stored in memory 110.

When a component is in need of replenishment, a line-side workstation operator, who would typically be a human operator (although a robotic operator could perform the same function), simply pushes the 'call' button 32. In response to operation of the call button, the call tag's microcontroller 38 generates a PUSH_BUTTON command signal, which is coupled to the timer circuit 117 and to the data select logic circuit 109, as described above. The timer circuit supplies a series of 'blink' enabling pulses 119 to the OR gate 116 and thereby through OR gate 75 and the AND gate 76. Coupling the PUSH_BUTTON signal to the data select logic circuit 109 for storage into the tag memory 110 causes a 'button pushed' status code to be appended to the call tag's identification code in order to distinguish a part call from a random blink (which normally has no push-button-associated status bits asserted).

The generation of a plurality of enabling pulses 119 by the timer circuit 117 serves to enhance communication reliability. Each enabling pulse causes the call tag to transmit a spread spectrum RF signal burst encoded with the identification (e.g., serial number) of the call tag and part call status data downloaded by the call tag's microcontroller to memory 110 through the data select logic 109. At the same time, the microcontroller 38 supplies a drive signal to the LED indicator 36, which is then illuminated or 'flashed' for a prescribed period of. time (e.g., one second) to confirm to the operator that a 'part call' burst has been transmitted.

The 'part call' RF burst emitted by the call tag is received by at least one and typically a plurality of burst emission readers 10 that are distributed within and/or around the workstation production environment of the manufacturing plant. The architecture and operation of the tag readers 10 and associated correlation-based, RF signal processors corresponds to that shown and described in the above-referenced '287 patent.

Suffice it to say that the use of correlation-based RF signal processors with the spatial distribution of multiple readers facilitates determining which spread spectrum signals transmitted by a call tag and received by a respective reader is a first-to-arrive transmission, so that an accurate determination can be made of the location of the call tag and therefore the destination of the delivery of the parts request in the call may be confirmed.

In addition to determining call tag location, (identification and status) data read out of the call tag's memory and superimposed on the call tag transmission is downloaded to the asset management data base 20, and linked therefrom to personal computer 26, which is programmed to display call tag location and associated parameter data in a form customized for the user's application. As pointed out above, in the case of line-side part replenishment, the decoded data may be displayed on a floor plan map of the manufacturing plant, to facilitate assimilation of information relating to the workstations' part replenishment requests and line-side delivery of those parts from storage.

Whether or not the outputs of the transmission readers are used to locate the call tag, the call tag identity (such as a call tag serial number) and any other (e.g., call status) data that was conveyed in the call tag's replenishment transmission burst is coupled to the asset management database 20, which associates the identification data with a particular part employed by the workstation where the call tag is located. As described in the '675 application, this allows the resource management operator to specify what component is to be accessed from storage, so that the requested part may be delivered to the identified call tag's associated workstation. For part call completion verification and inventory tracking purposes, a record of each part request and delivery transaction may be forwarded from the resource management processor to a (fixed or mobile) data terminal associated with the plant's parts storage area. A part delivery operator may then clear or reset the request once the material has been delivered to the workstation that originated the replenishment request.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. For use with a system for producing an item from a plurality of different components, which are retrieved from storage and delivered to workstations for use in production of said item in response to a parts call operation that includes the steps of providing a part call tag in association with a respective workstation, said part call tag including a wireless transmitter device, applying to said part call tag a stimulus that causes said wireless transmitter device to transmit a part call signal encoded with information representative of an identification of said wireless transmitter device, detecting said part call signal at at least one transmission reader, processing said part call signal as detected at said at least one transmission reader to identify said wireless transmitter device, and accessing a database containing information that associates said wireless transmitter device with a component employed by said respective workstation, based upon said information representative of the identification of said wireless transmitter device to determine what component is to be replenished at said respective workstation, a method of providing an indication of the length of time that has elapsed since the last part call from said part call tag comprising the steps of:

(a) providing an elapsed time clock in association with said part call tag; and (b) resetting said elapsed time clock, in response to applying said stimulus to said part call tag that causes said wireless transmitter device to transmit said part call signal.

2. A method according to claim 1, wherein step (a) comprises incorporating said elapsed time clock into said part call tag, and employing a common input device to apply said stimulus and to reset said elapsed time clock.

3. For use with a manufacturing facility for producing an item from a plurality of different components, which are retrieved from storage and delivered to workstations for use thereby in production of said item, a system for controlling replenishment of components employed by the workstations, the system comprising:

at or in proximity of each of the workstations, at least one part call tag containing a wireless transmitter device, which is operative, in response to a stimulus applied thereto associated with the need for replenishment of a respective component used by a workstation, to controllably transmit a part call signal encoded with information representative of said part call tag;

at least one transmission reader being operative to detect said part call signal;

a processing subsystem, which is operative to process said part call signal as detected by said at least one transmission reader so as to identify said part call tag;

a database containing information that associates said at least one part call tag with respective ones of the plurality of different components and workstations associated therewith, and being operative, in response to said information representative of said at least one part call tag identified by said processing subsystem, to indicate what component is to be replenished at said each workstation; and at least one elapsed time clock respectively associated with said at least one part call tag and being adapted to be reset in response to said stimulus that causes the wireless transmitter device of said at least one part call tag to transmit said part call signal.

4. A system according to claim 3, wherein said elapsed time clock is incorporated into said part call tag, and wherein said part call tag has a common input device to apply said stimulus and to reset said elapsed time clock.

5. A part call tag for use with a system for controlling replenishment of components used by workstations of a manufacturing facility to produce an item, replenished components being retrieved from storage and delivered to said workstations, said system including at least one transmission reader operative to detect a part call signal, a reader output processing subsystem, which is operative to recover information contained in said part call signal, and a database containing information that associates information contained in said part call signal with a respective one of said components and workstations associated therewith, so as to indicate what component is to be replenished at a workstation, said part call tag comprising:

a wireless transmitter, which is operative, in response to a stimulus applied to the part call tag associated with a request for replenishment of a component used by the workstation, to controllably transmit said part call signal encoded with an identification of said part call tag; and an elapsed time clock that is adapted to be reset in response to said stimulus that causes the wireless transmitter device to transmit said part call signal.

6. A part call tag according to claim 5, wherein said elapsed time clock is incorporated into said part call tag, and wherein said part call tag has a common input device to apply said stimulus and to reset said elapsed time clock.

* * * * *